July 16, 1957  E. F. OGLES ET AL  2,799,229
MOBILE IRRIGATION DITCH PUMPING APPARATUS
Filed Feb. 1, 1955  4 Sheets-Sheet 1

Ethridge F. Ogles
J C. Ogles
INVENTORS

BY *[signatures]*
Attorneys

Ethridge F. Ogles
J C. Ogles
INVENTORS

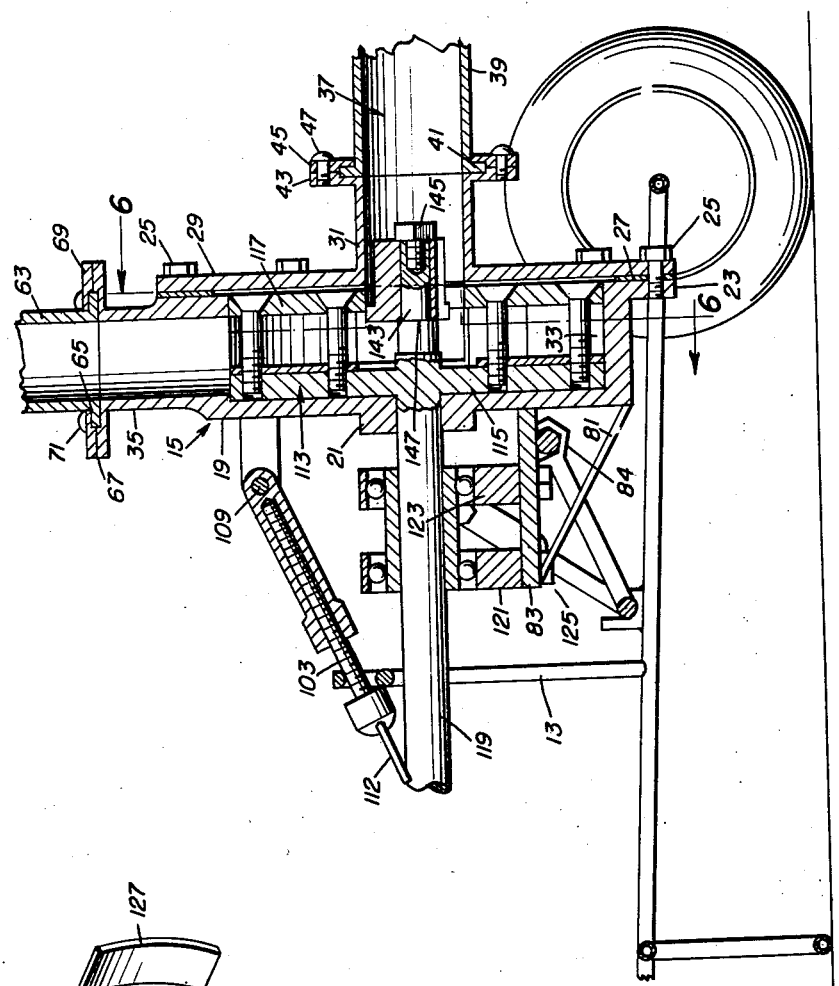
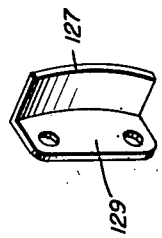
Ethridge F. Ogles
J C. Ogles
INVENTORS

July 16, 1957  E. F. OGLES ET AL  2,799,229
MOBILE IRRIGATION DITCH PUMPING APPARATUS
Filed Feb. 1, 1955  4 Sheets-Sheet 4

Ethridge F. Ogles
J. C. Ogles
INVENTORS

BY *Clarence A. O'Brien*
*and Harvey B. Jackson*
Attorneys

ରWE# 2,799,229

MOBILE IRRIGATION DITCH PUMPING APPARATUS

Ethridge F. Ogles and J C. Ogles, Alvin, Tex., assignors to W. H. Hinton and Robert H. Hinton, Altus, Okla.

Application February 1, 1955, Serial No. 485,455

7 Claims. (Cl. 103—218)

Our invention relates to improvements in mobile pumping apparatus for drawing water from irrigation ditches and discharging the water at a substantial elevation over fields, crops and the like.

The primary object of our invention is to provide apparatus for the above purpose in which a centrifugal side suction pump is carried by a wheeled chassis for backing up to an irrigation ditch, the pump having a rigid rearward extending pipe for taking in water from a ditch and the pump being bodily adjustable upwardly and downwardly and tiltable forwardly and rearwardly to lower the pipe into a ditch for pumping operations or to raise the same out of the ditch and above ground for transporting of the pump.

Another object is to provide in such apparatus for drive of the pump from the power take-off shaft of the tractor.

Still another object is to provide in such a pump an impeller having improved suction producing blades and an auxiliary impeller tending to obviate clogging of the pump by sand and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an enlarged view in vertical longitudinal section taken on the line 5—5 of Figure 1;

Figure 7 is a view in perspective of one of the blades of the pump impeller suction producing blades;

Figure 1:
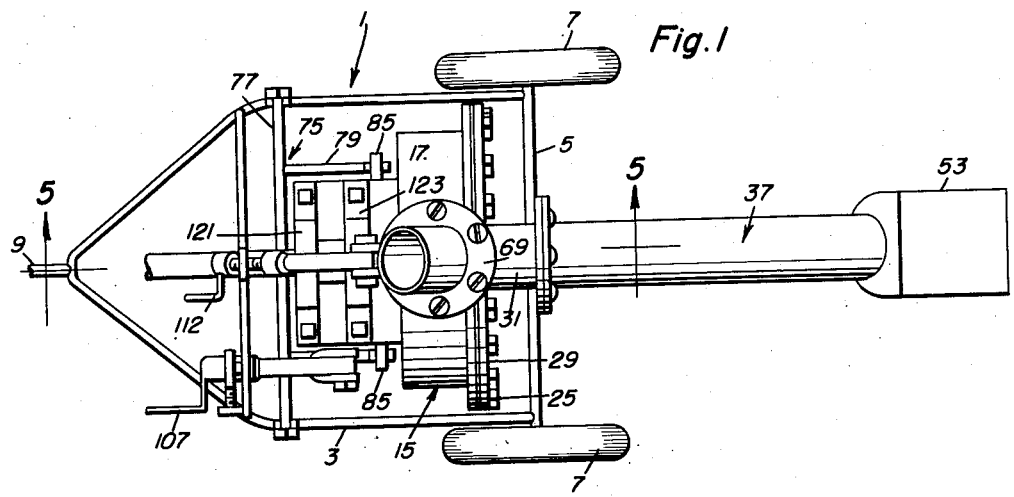
Figure 1 is a view in plan of our improved pumping apparatus in the preferred embodiment thereof.

Referring to the drawings by numerals and first to Figures 1 to 9, the pumping apparatus of our invention in the preferred embodiment thereof comprises a two wheeled chassis 1 including a preferably U-shaped chassis frame 3 extending forwardly from and terminally attached in any suitable manner to an axle member 5 supported at its ends by a pair of ground wheels 7 on which said frame 3 is vertically tiltable. A draft tongue 9 extends forwardly from said frame 3 for coupling in the usual manner to the rear draft bar, not shown, of a tractor for draft of the apparatus thereby. A depending central front leg on the front end of said chassis frame 3 supports said end when the apparatus is uncoupled. A transverse arched yoke 13 upstanding from and attached to the sides of the chassis frame 3 forwardly of the axle rod 5 completes said frame.

A centrifugal side suction pump 15 is mounted on the chassis frame 3 by means presently described and comprises a circular upright pump casing 17 extending transversely of said frame 3 to dispose the axis of the pump longitudinally of said frame 3. The pump casing 17 comprises an annular front plate 19 having an axial journal bearing 21 thereon and is open at its rear side with a circumferential edge flange 23 to which is bolted, as at 25, against a sealing gasket 27, an annular closure plate 29 provided with an axial rearwardly extending intake nipple 31 opening into an impeller chamber 33 in said casing 17 for impellers presently described. The casing 17 is provided with a discharge nipple 35 upstanding from the top thereof in the vertical center of the pump.

An obtuse angled pump intake pipe 37 extends rearwardly from the intake nipple 31, with a front end portion 39 coaxial with the intake nipple 31 and fixed thereto by a front end flange 41 clamped between a recessed terminal flange 43 on said nipple 31 and a recessed keeper ring 45 bolted as at 47 to flange 43. The major portion 49 of the intake pipe 37 inclines downwardly from its front end portion 39 to facilitate lowering the same over the bank of an irrigation ditch 51 and is provided with a terminal enlarged valve casing and sand trap 53 in which a gravity closed inwardly opening flap valve 55 is hinged, as at 57, and provided with a sealing gasket 59 seating against an internal flange 61 in said casing when said valve is closed.

A discharge pipe 63 rises from the discharge nipple 35 and is rotatably attached thereto by a terminal flange 65 thereon interposed between a recessed terminal flange 67 on the nipple 35, and a keeper ring 69 bolted, as at 71, to the flange. The discharge pipe 63 has an angular upper end portion 73 which may be of any suitable angle and length for discharging water at a high level away from the apparatus.

Means for mounting pump casing 17, which is to say the pump 15, on the chassis frame 3 for vertical floating adjustment bodily comprises a vertically rocking cradle 75 in front of said casing and including a rock shaft 77 journaled at its ends transversely of said frame 3 on the sides of said frame 3 and having a pair of rearwardly extending lift arms 79 thereon at opposite sides of the longitudinal center of said frame 3 formed with terminal upwardly opening hooks 81. A horizontal ledge 83 suitably fixed to the front of the casing 17 adjacent its bottom extends forwardly between the lift arms 79 and is rockably suspended thereby by side trunnions 85 thereon journaled in the hooks 81. The ledge 83 is suitably braced to the casing 15 as at 84.

Means for rocking the cradle 75 comprises an operating screw feed shaft 87 above the rock shaft 77 threaded into a sleeve 89 terminally pivoted at one end as at 91 to a crank arm 93 fast on one end of the rock shaft 77. The screw shaft extends forwardly of said crank arm 93 through the beforementioned yoke 13 and is journaled in a bearing bracket 95 journaled as at 97 horizontally in an ear 99 on said yoke. An operating hand crank 101 is suitably fixed on the front end of the screw shaft 87 and bears rearwardly against the bracket 95 to prevent rearward sliding of said shaft 87 in said bracket.

The pump 15 is tiltable forwardly and rearwardly on the trunnions 85 in any vertically adjusted position for a purpose presently clear, by the following means. A screw feed shaft 103 extends rearwardly and is journaled in a bearing lug 105 on top of the yoke 13 and is threaded into a sleeve 107 pivoted at its rear end, as at 109, between a pair of lugs 111 on the front of the casing 17 extending forwardly therefrom adjacent the top of said casing. The shaft 103, sleeve 107 and lugs 105, 111 are arranged above the tilting axis of the pump 15 for leverage purposes. An operating hand crank 112 is suitably fixed on the front end of said shaft 103 and bears rearwardly against the lug 105 to prevent sliding of said shaft rearwardly.

A main impeller 113 for the pump 15 comprises a pair of front and rear cheek disks 115, 117 laterally spaced and rotatably fitted in the impeller chamber 33. The front disk 115 is preferably formed on the pump shaft 119 which extends forwardly of the casing 17 through the yoke 13 is journaled in the bearing 21 and on a pair of front and rear pillow bearings 121, 123 bolted, as at 125, on the ledge 83 and designed for connection by a flexible shaft, not shown to the rear power take-off, not shown, of the tractor to which the chassis frame 3 is coupled. A series, preferably six, of impeller blades 127 each with a longitudinal side flange 129 fit between said cheek disks 115 and are detachably fixed between said disks in radiating position by machine screws 131 passing through the rear disk 29 and through the ends of the flanges 129 and securing said disks together with the blades 127 clamped therebetween and said flanges 129 clamped against the front disk 115.

Figure 6:
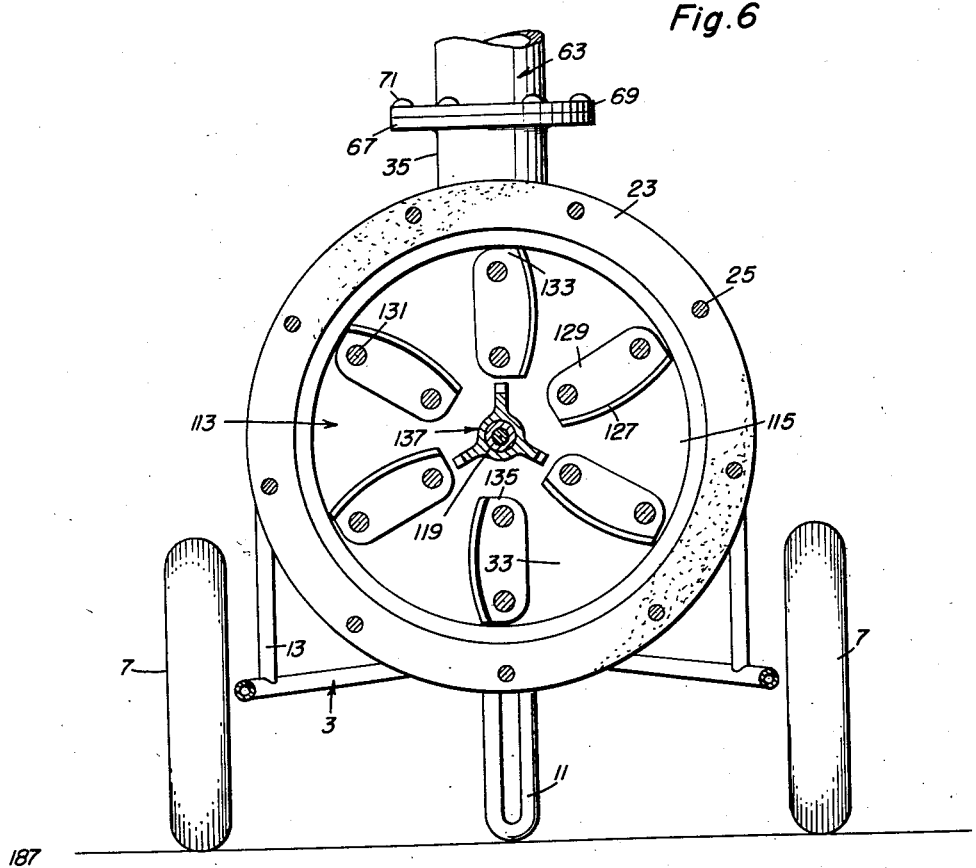
Figure 6 is a view in vertical transverse section taken on the line 6—6 of Figure 5.

The impeller blades 127 have their outer ends 133 substantially flush with the perimeter of the disks 115, 117 and their inner ends 135 spaced in a circle around the intake nipple 31 and are longitudinally curved slightly in the arc of a circle with concave sides facing in the direction of rotation of the impeller, which is counter-clockwise as shown in Figure 6, for suction purposes at the intake nipple 31 to increase the effectiveness of said blades. In case the impeller 113 is rotated in a clockwise or reverse direction the blades 127 may be reversed after removing the closure plate 23 and the screws 131 by turning said blades around with their concave sides facing in the reverse direction of rotation of said impeller and clamping the blades in their reversed position between the disks 115, 117 by the screws 131. This provides for operation of the impeller 113 by operation of the power take-off shaft of a tractor reversely of normal operation.

An auxiliary propeller 137 with three blades 139 radial to a hub 141 has its hub 141 sleeved onto a reduced rear end 143 on the pump shaft 119 and clamped in fixed position thereon by a headed screw bolt 145 turned into said shaft and clamping said hub against a circumferential shoulder 147 on said shaft. The blades 139 work within the confines of the inner ends 135 of blades 127 with a slight clearance, are spaced rearwardly of the front disk 115 and have reduced major portions 149 working in the front end of the intake nipple 31. As will be seen the auxiliary impeller 137 revolves with the pump shaft 119 and is designed primarily to prevent clogging of the pump by sand or the like and so as to increase the efficiency of the pump.

Figure 10:
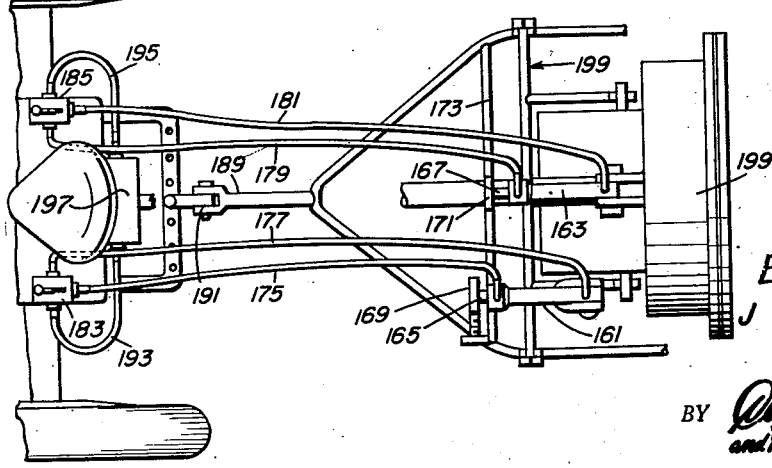
Figure 10 is a view in plan of a modified embodiment of the pumping apparatus.

The modified embodiment shown in Figure 10 is the same as the preferred with the following exceptions. The sleeves 161, 163 corresponding to the sleeves 89, 107 of the preferred embodiment comprise hydraulic cylinders slidable on pistons 165, 167 extending rearwardly from lugs 169, 171 suitably pivoted on the yoke 173 for vertical swinging to compensate for vertical throw of said pistons and cylinders. Pairs of flexible pressure lines 175, 177, 179, 181 extend from opposite ends of the sleeves 161, 165 to pressure control valves 183, 185 on the tractor 187 to which the chassis tongue 189 is coupled as at 191, said valves being suitably connected as by pipes 193, 195 to the conventional hydraulic pump 197 of the tractor. Thus hydraulic means is provided for operating the cradle to raise and lower the pump and hydraulic means for tilting said pump.

Figure 2:
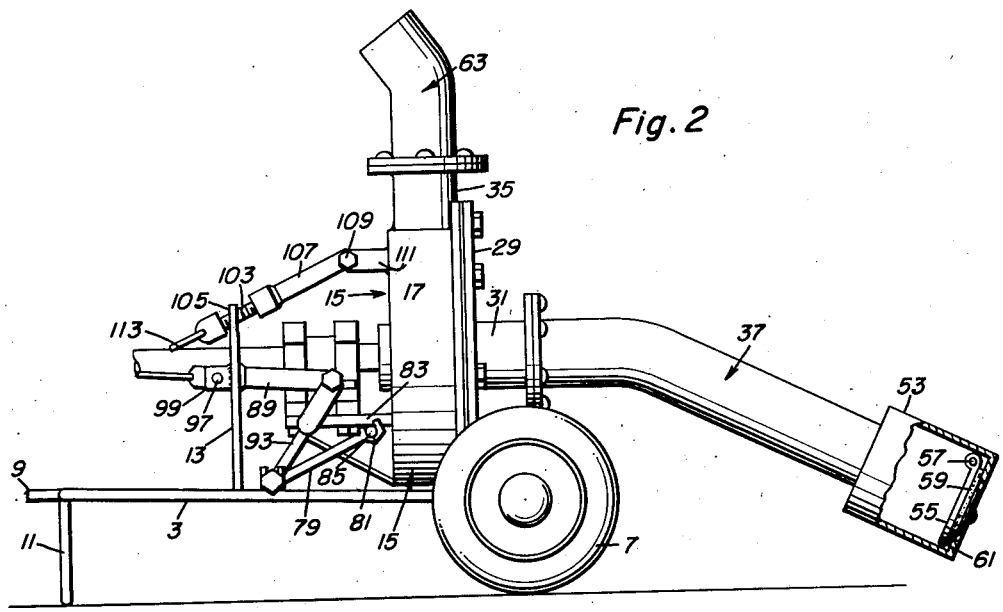
Figure 2 is a view in side elevation of the same; partly broken away and shown in section with the pump and intake pipe adjusted and tilted to raise the intake pipe clear of the ground for transporting of the pump.
Figure 9:
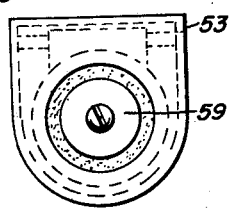
Figure 9 is an enlarged view in rear end elevation of the intake pipe.
Figure 3:
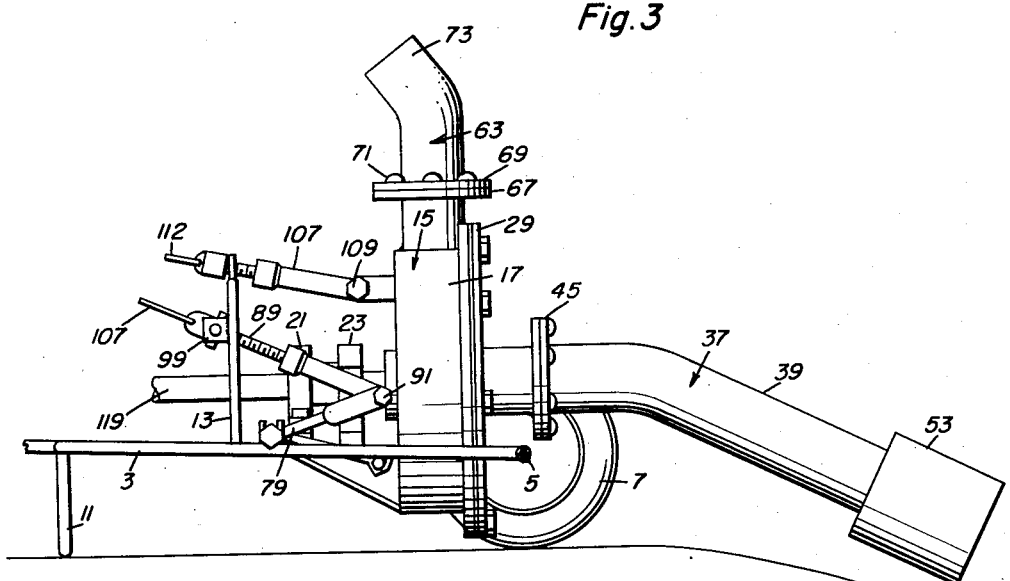
Figure 3 is a view in side elevation with the pump and intake pipe lowered to lower the intake pipe into a ditch for pumping purposes.
Figure 4:
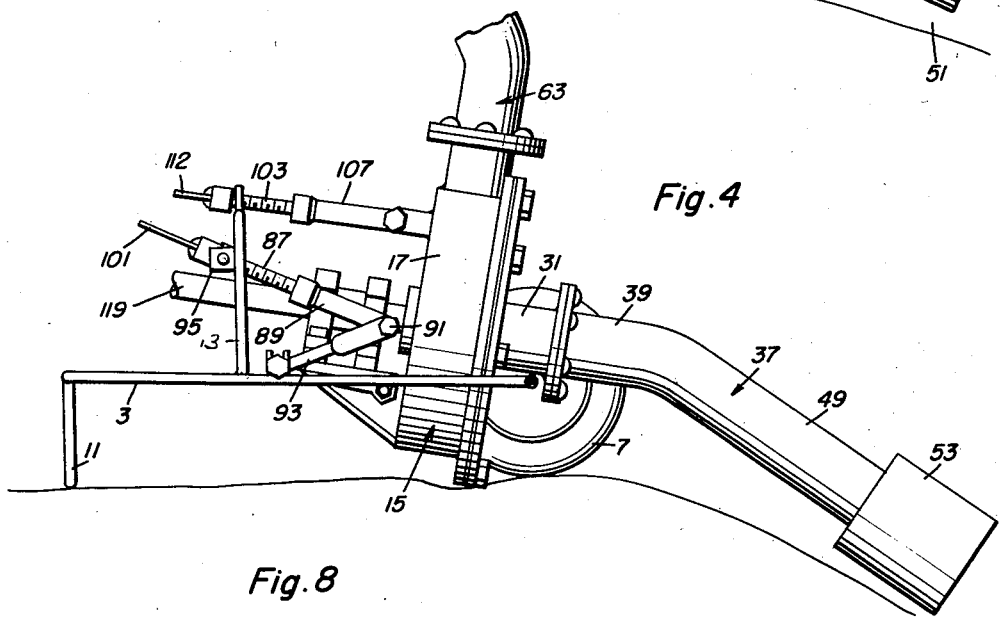
Figure 4 is a view similar to Figure 3 but showing the pump and intake pipe both lowered and tilted to lower the intake pipe into a ditch.
Figure 8:
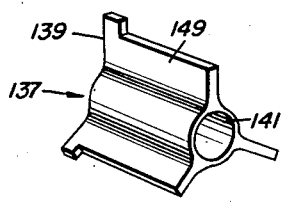
Figure 8 is an enlarged view in perspective of the auxiliary impeller for the pump.

In the use and operation of the apparatus the pump 17 is raised and tilted until the intake pipe 37 is sufficiently elevated above the ground for transporting for instance as shown in Figure 2. The apparatus may then be backed up to an irrigation ditch 51 as shown in Figures 3 and 4 until the valve casing 53 overhangs the water, after which it may be lowered into the water by lowering the pump 17 as shown in Figure 3 or by lowering said pump and tilting it rearwardly as shown in Figure 4. Obviously the discharge pipe 63 may be oriented in any desired position for discharge of water in a desired direction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. Pumping apparatus for backing up to an irrigation ditch and lifting water therefrom comprising a wheel supported chassis frame having a rear end and a front end adapted for coupling to the rear end of a tractor, an upright cylindrical pump casing in said frame having its axis longitudinal with respect to said frame and front and rear sides, an intake pipe attached to said rear side in the axis of the casing to open into the casing and extend rearwardly therefrom for lowering and raising into and out of said ditch, means for lowering and raising said pipe compirsing a cradle on said frame rockable vertically in opposite directions and in which said casing is pivoted for tilting forwardly and rearwardly and rotary impeller means in said casing having a shaft extending forwardly out of said front side for coupling to and drive by a rear power take-off shaft of a tractor.

2. The combination of claim 1, said first named means further including screw feed devices for rocking said cradle.

3. The combination of claim 1, said first named means further comprising screw feed means for tilting said casing.

4. The combination of claim 1, said pipe having a downwardly inclined rear portion for lowering into a ditch.

5. The combination of claim 1, said casing having a discharge pipe in the vertical center thereof rotatably attached to the casing.

6. The combination of claim 1, said cradle including a rock shaft journaled transversely on said frame, and a pair of rearwardly extending arms on said rock shaft pivotally supporting said casing for tilting thereon.

7. The combination of claim 1, said first named means further comprising a yoke rising from said frame, a screw shaft rockably mounted on said yoke and a sleeve having the screw shaft threaded therein and being pivoted to said casing.

References Cited in the file of this patent

UNITED STATES PATENTS

| | | |
|---|---|---|
| 1,717,969 | Goodner | June 18, 1929 |
| 2,098,621 | Gollnick | Nov. 9, 1937 |
| 2,214,677 | North | Sept. 10, 1940 |
| 2,456,019 | Pettipiece | Dec. 14, 1948 |
| 2,559,785 | Morgan | July 10, 1951 |
| 2,698,583 | House | Jan. 4, 1955 |